March 27, 1934.   L. KOVACS   1,952,133

COMBINATION SIGNAL LIGHT FOR VEHICLES

Filed Aug. 24, 1931   2 Sheets-Sheet 1

INVENTOR
Louis Kovacs
BY
Zoltan P Holachek
ATTORNEY

March 27, 1934.  L. KOVÁCS  1,952,133
COMBINATION SIGNAL LIGHT FOR VEHICLES
Filed Aug. 24, 1931  2 Sheets-Sheet 2
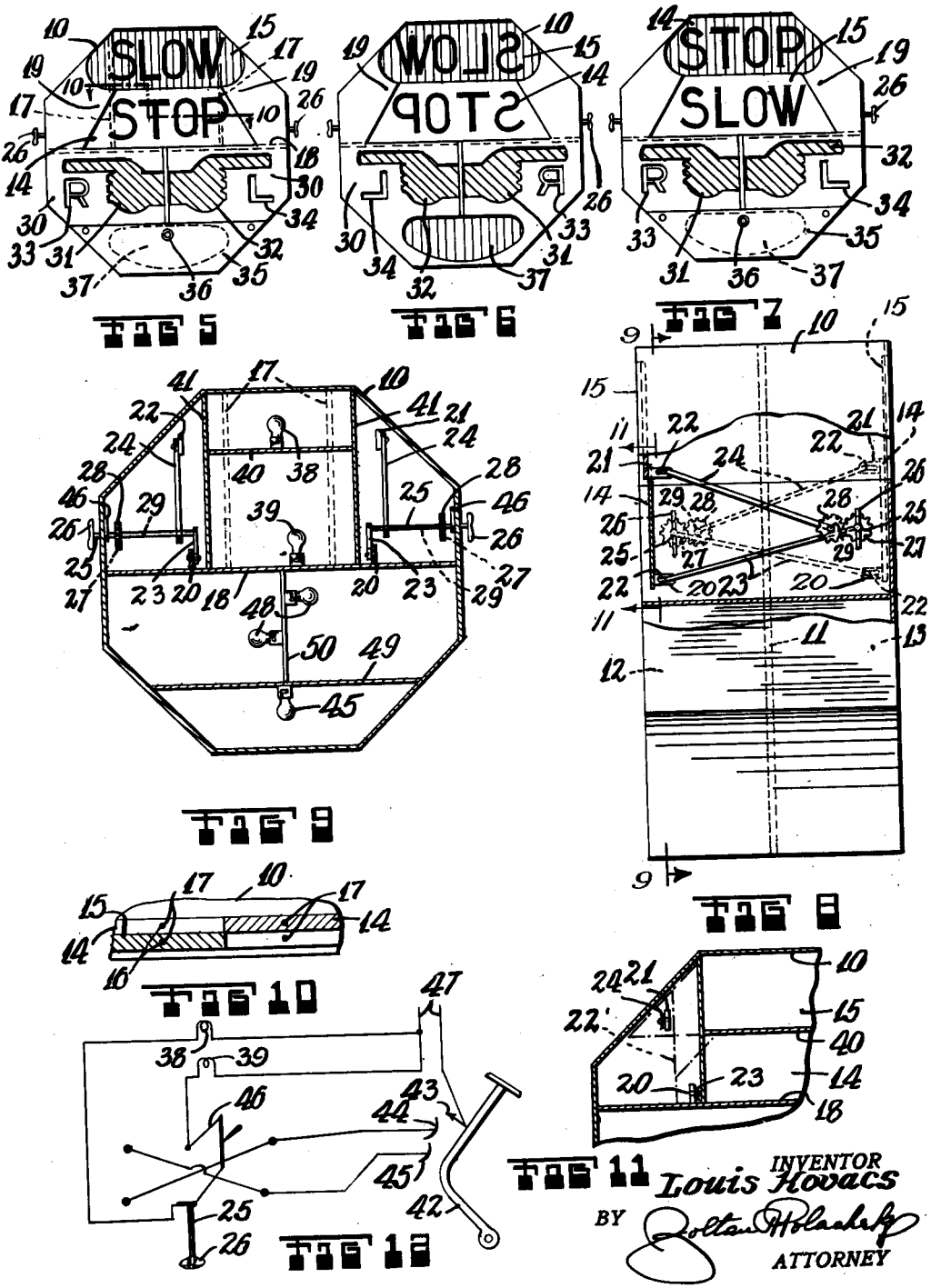

Patented Mar. 27, 1934

1,952,133

UNITED STATES PATENT OFFICE 1,952,133

COMBINATION SIGNAL LIGHT FOR VEHICLES

Louis Kovács, Toledo, Ohio

Application August 24, 1931, Serial No. 558,868

3 Claims. (Cl. 177—337)

This invention relates to new and useful improvements in a combination signal light for vehicles.

This invention has for an object the provision of a combination signal light which is characterized by a stop sign, a slow sign, a directional signal sign, and a tail light.

The invention has for an object the provision of a combination signal light for vehicles characterized by a stop sign above a slow sign in a casing, means for operating said slow sign upon initial depression of the brake of a vehicle and the stop sign upon complete depression, and means for changing the relative positions of the signs so that the slow sign is on top.

It is a further object of this invention to also provide a directional signal beneath the stop and slow signals in the form of hands pointing towards the right and left. Further, it is contemplated to provide a tail light below the directional signals upon the rear of the complete signal. Furthermore, it is proposed to place the name of the car on the tail light.

It is a still further object of this invention to so construct the signal that it is a duplicate when viewed from the front or the rear with the exception that on the rear side the tail light be provided while it be omitted on the front side.

As a still further object of this invention it is proposed to slidably mount the stop and slow signs, to arrange manual means for shifting the signs, and automatic means for switching the operation of the lights which illuminate these signs so as to properly signal stop or slow.

And as a still further object of this invention, it is proposed to construct a combination signal light for vehicles which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 5 is a front elevational view of a signal constructed according to this invention.

Fig. 6 is a rear elevational view of Fig. 5.

Fig. 7 is a similar view to Fig. 5, showing the signs interchanged.

Fig. 8 is an end elevational view of Fig. 5.

Fig. 9 is a vertical sectional view taken on the line 9—9 of Fig. 8.

Fig. 10 is a fragmentary enlarged horizontal sectional view taken on the line 10—10 of Fig. 5.

Fig. 11 is a fragmentary enlarged sectional view taken on the line 11—11 of Fig. 8.

Fig. 12 is a schematic wiring diagram of the controls and lamps which illuminate the stop and slow signs.

Figure 1:
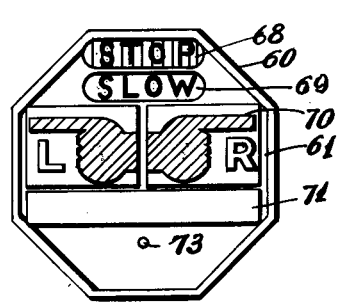
Fig. 1 is a front elevational view of a signal constructed according to this invention.
Figure 3:
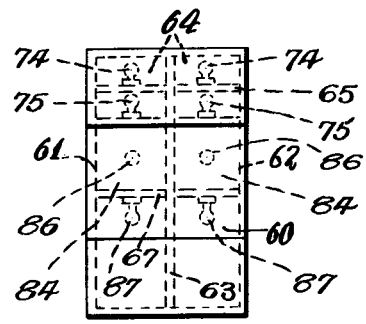
Fig. 3 is a side elevational view of the signal.
Figure 2:
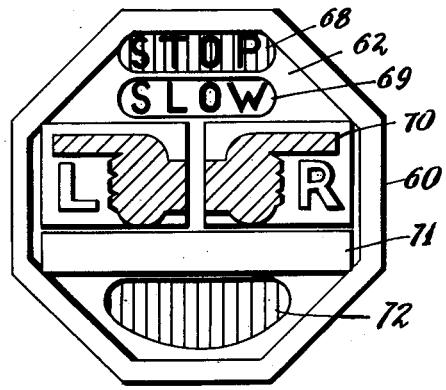
Fig. 2 is a rear elevational view of Fig. 1.
Figure 4:
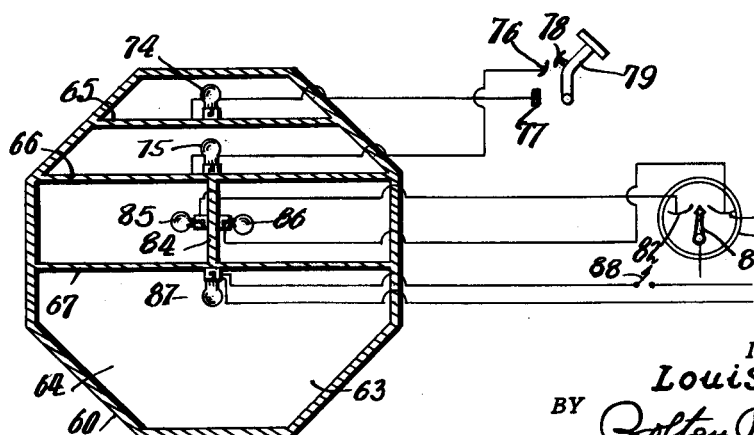
Fig. 4 is a view of the signal with one of the glasses removed so as to disclose the interior construction.

The signal, according to this invention, comprises a casing 60 with opened front and rear sides. This casing is shown of octagonal shape, though other shapes may be used. The front and rear sides of the casing are flat and closed by glass plates 61 and 62, respectively. A transverse partition 63 divides the casing 60 into front and rear compartments 64. In each of these compartments there is a horizontal partition 65 spaced from an intermediate horizontal partition 66 which in turn is spaced from a bottom horizontal partition 67. Each of the glasses 61 has a "stop" portion 68 located above the partition 65, a "slow" portion 69 between the partitions 65 and 66, a "directional indication" portion 70 located between the partitions 66 and 67, and a "tail light" portion 71 below the partition 67. The rear cover plate has a "tail light" portion 72. The "directional" signs preferably should be green. Both the front and rear cover plates have their "tail light" portions 71 inscribed with the name of the particular car upon which the signal is used.

An opening 73 is formed in the front plate 61 for the purpose of allowing the passage of electric wires to illuminate various lamps within the casing. The "stop" sign 68 and the "slow" sign 69 are illuminated by lamps 74 and 75 respectively. These lamps are in circuits which include contacts 76 and 77 spaced from each other. A live wire contact 78 upon the brake pedal 79 of a motor vehicle is capable of first contacting with the contact 76 to light the "slow" sign and then with the contact 77 to light the "stop" sign. The direction indicator is operated by a switch 80 upon the steering wheel 81 of a vehicle. This switch can coact with the contact 82 to light the left portion of the sign and 83 to light the right portion of the sign. A partition 84 divides the directional signal portion of the casing into two separate divisions so that lamps 85 and 86 may be used respectively to light the left and the right portions. Another lamp 87 constitutes the tail lamp of the vehicle and is operable by a switch 88.

In operation, the signal lamp should be supported upon the fender of a vehicle so that it may be visible from the front or back. When the brake is initially applied, the "slow" sign illuminates to indicate that the vehicle is coming to a stop. When the brake is fully depressed the "stop" sign illuminates while the "slow" sign is extinguished. The "directional" signs work when the steering wheel is turned to one side or the other.

In Figs. 5 to 12 inclusive a modification has been shown in which the signal consists of a casing 10 with opened front and rear sides. This casing is shown of octagonal shape, though other shapes may be used. The front and rear sides are flat as may be understood by inspecting Fig. 8. A transverse partition 11 extends across the center line of the casing so as to divide it off into a front compartment 12 and a rear compartment 13. The mechanisms of each of these compartments are identical so only one side will be considered for detailed explanation.

A stop sign 14 and a slow sign 15 are arranged within the casing so as to be viewable through one of the opened sides. These signs are in vertical planes slightly adjacent each other, as may be seen from inspecting Fig. 10, so that they can slide relatively up and down to positions in which either of the signs is at the top. The slidable mounting is accomplished by providing vertical apertures 16 extended through the sign and parallel vertical wires 17 extended through the apertures 16 and attached firmly at the top and at the bottom. The sign elements 14 and 15 can slide on these wires to either of the positions before mentioned. As shown, the wires 17 are attached at the top upon the top of the casing 10 and at the bottom upon a central horizontal partition 18 within the casing.

Friction is depended upon to hold the signs 14 and 15 as placed. If it is found necessary, some external means may be provided for accomplishing this. One such means may consist of forming the rods 17 with elastic coatings on their outer sides so as to frictionally engage very tightly within the apertures 16, but not tight enough so as to bind moving of the sign elements manually. The stop sign 14 is provided with the word "Stop", while the slow sign 15 is provided with the word "Slow". Preferably, the rear faces of these signs should be corrugated so that the light going through them is soft. The signs 14 and 15 are substantially of the same shape so that they may assume interchanged positions. A portion of the casing 10 extends at the points 19 so as to cover the opening produced by the lower sign, which is the same size as the upper sign but when in the lowered position within a larger part of the casing.

A means is also provided for manually moving the signs 14 and 15 so that either one is at the top and the other one immediately below. This means is in the form of lugs 20 projecting from the ends of the stop sign and in different vertical planes from other lugs 21 projecting from near the ends of the slow sign. This is clearly shown in Fig. 11 where the dot and dash line 22' shows the line of motion of the lugs. Each of these lugs is formed with horizontal slots 22 which receive pins in the ends of rearward extending arms 23 and 24 respectively.

The arms 23 connect up with the lugs 20 and extend inwards and rigidly connect with a stop shaft 25 rotatively mounted through the casing so that a portion extends to the exterior. A handle 26 is attached upon the extended portion for manual turning. A gear 27 is fixed upon the stud shaft 25 and meshes with another gear 28 upon a spindle 29 rotatively supported on the casing 10 and rigidly connected with the other arm 24. When the handle 26 is turned clockwise in Fig. 8, the arm 23 will move upwards for moving the slow sign 15 to its top position, while simultaneously the arm 24 will move downwards for moving the stop sign to the lower position. In Fig. 8 a duplication of the means for moving the signs to the different positions has been shown, and this means connects with the signs in the other compartment of the casing. In Fig. 9 it should be noticed that the second means is on the left hand side of the device, while the means first described is on the right hand side.

The casing 10 is also provided with a directional signal in the form of a stationary slab of glass 30 within the casing at a position immediately below the lowest one of the signs 14 and 15. The slab 30 is divided into two portions with a hand 31 of one portion pointing towards the right, and a different hand 32 of the other portion pointing towards the left. In addition, the right hand portion is indicated with a large "R" 33 and the left hand with a large "L" 34. Immediately below the directional signs on the front side of the signal device, there is a cover 35 provided with an opening 36 to which the electric wires for illuminating the various lamps within the casing passes. On the rear side of the signal, a tail light 37 is arranged immediately below the directional signs.

A means is provided for illuminating the signs 14 and 15, and this means includes lamps 38 and 39 behind each of the signs and arranged for consecutive operation so that upon initial depression of a brake of a vehicle provided with the device, the slow sign lights and upon further compression the stop sign lights. The lamps 38 and 39 are separated from each other by a horizontal partition 40 so that their lights are thrown only upon the sides directly to the front. In addition, vertical partitions 41 are arranged on both sides of the lamps so as to divide off the mechanism which changes the relative positions of the sign elements.

The operation of the lamps 38 and 39 are controlled by a contact arranged upon the foot pedal of the brake and engageable against a stationary contact to close the circuit through one of the lamps and through a second stationary contact to close the circuit through the second lamp. A reversing switch is also provided to change the lighting of the lamps whenever the positions of the sign elements are changed.

The reversing means is connected with the manual means for moving the signs into their different positions so as to work automatically and illuminate the signs properly regardless in which positions they may be in. In Fig. 12 the details of the wiring system have been shown and it should be noticed that numeral 42 indicates the foot brake of a vehicle. A contact 43 is attached upon the foot brake and engageable upon initial depression of the latter element with a stationary contact 44, and upon full depression with a second stationary contact 45. The contacts 44 and 45 are connected with a reversing switch 46. The spindle 25 connects with the movable blade of the reversing switch 46 so that as the handle 26 is turned for moving the signs 14 and 15 into the positions mentioned, simultaneously the switch 46 is operated to cause the lamp 38 to light upon the initial depression of the pedal 42 and the lamp 39 upon further depression of the pedal, or just the opposite, that is, the lamp 39 to light upon initial depression and the lamp 38 upon full depression. The power leads are indicated by numeral 47. It should be noticed that the lamps 38 and 39 are connected in series with the reversing switch 46 and the contacts 44 and 45 respectively.

When the switch 46 is closed towards the right, current may run from one of the power leads 47 through the contacts 43 and 44 and through the lamp 39 back to the return. Upon further depression of the pedal, the current may run from one of the leads 47 through the contacts 43, 45, through the lamps 38 and back to the return. When the switch 46 is thrown towards the left and the pedal 42 is initially depressed, a circuit exists from one of the leads 47 through the contacts 43 and 44 to the lamp 38 and the return. Upon further depression of the pedal, a circuit will exist from one of the leads 47 through the contacts 43 and 45 and through lamp 39 back to the return.

In Fig. 9 lamps 48 have been shown for illuminating the directional sign elements 31, 33 and 34, 34. A partition 49 divides off the interior of the casing 10 so that the lamps only illuminate the elements mentioned. A vertical partition 50 divides the compartment in which the lamps are separated from each other. It is intended that the lamps 48 be connected in a conventional fashion with the steering column of the vehicle so that the directional signal works automatically. The details of this arrangement are not shown, since it forms no part of the invention. A tail light 51 is mounted below the partition 49 for illuminating the tail light sign 37. This tail light should be wired as customary tail lights are wired, no details of such wiring being shown since it forms no part of this invention.

The operation of the device will be automatic upon operation of the vehicle provided with it. When a driver slows down his car by slightly stepping upon the brake, the slow sign will light. This will warn others that the driver is slowing down. In the event that the necessity arises for completely stopping the car, the stop sign will be illuminated. Preferably, the slow sign should be of pale red glass, while the stop sign should be of deep red glass so that they are readily distinguished. The sign elements 14 and 15 may be relatively interchanged as before described so that either one is at the top according to the tastes of the user of the device, or to city or State ordinances. Furthermore, if the lamp which operates the stop sign burns out, the sign elements may be interchanged so as to keep the stop sign in operation.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A combination signal light for vehicles, comprising a casing with an open side, a stop sign and a slow sign within said casing viewable through said open side, means for moving said signs so that either one is at the top and the other one immediately below, means for illuminating said sign including a lamp behind each sign, and means for operating said lamps to operate the slow sign first and the stop sign second regardless of their relative positions upon initial and complete depression respectively of a brake of a vehicle provided with the device.

2. A combination signal light for vehicles, comprising a casing with an open side, a stop sign and a slow sign within said casing viewable through said open side, means for moving said signs so that either one is at the top and the other one immediately below, means for illuminating said sign including a lamp behind each sign, and means for operating said lamps to operate the slow sign first and the stop sign second regardless of their relative positions upon initial and complete depression respectively of a brake of a vehicle provided with the device, said means for illuminating said signs including a reversing switch operating as said signs are moved to changed positions.

3. A combination signal light for vehicles, comprising a casing with an open side, a stop sign and a slow sign within said casing viewable through said open side, means for moving said signs so that either one is at the top and the other one immediately below, means for illuminating said sign including a lamp behind each sign, and means for operating said lamps to operate the slow sign first and the stop sign second regardless of their relative positions upon initial and complete depression respectively of a brake of a vehicle provided with the device, said means for illuminating said signs including a reversing switch operating as said signs are moved to changed positions, said stop and slow signs being slidably supported in adjacent planes so that they may move relatively past each other.

LOUIS KOVÁCS.